Feb. 26, 1963   G. W. CHILDS   3,079,147
SHEET FEEDING
Filed Sept. 2, 1960   3 Sheets-Sheet 1

INVENTOR
George William Childs

BY
Stevens, Davis, Miller & Mosher
ATTORNEYS

Feb. 26, 1963  G. W. CHILDS  3,079,147
SHEET FEEDING
Filed Sept. 2, 1960  3 Sheets-Sheet 2
FIG.3.
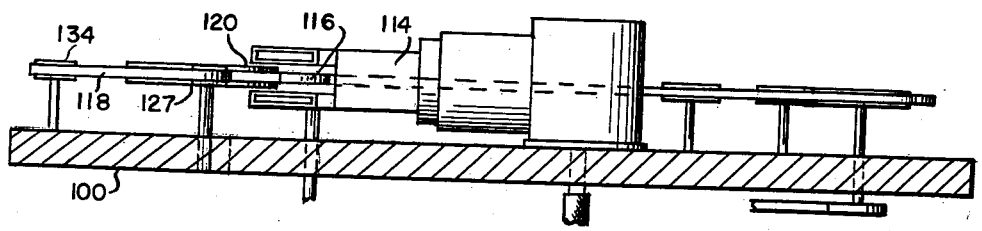
FIG.4.
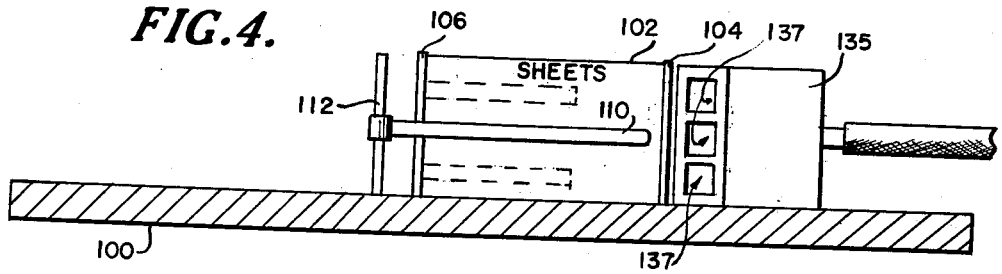
FIG.5.
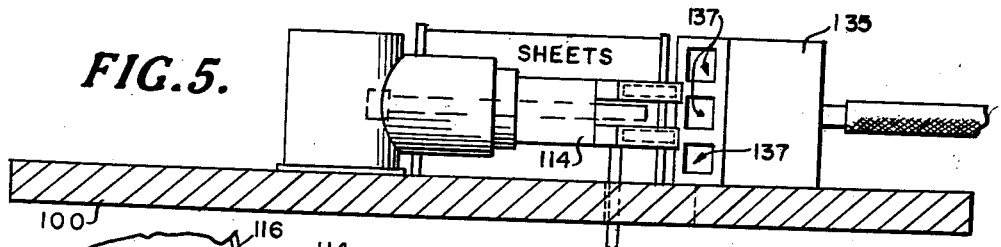
FIG.9.
FIG.6.
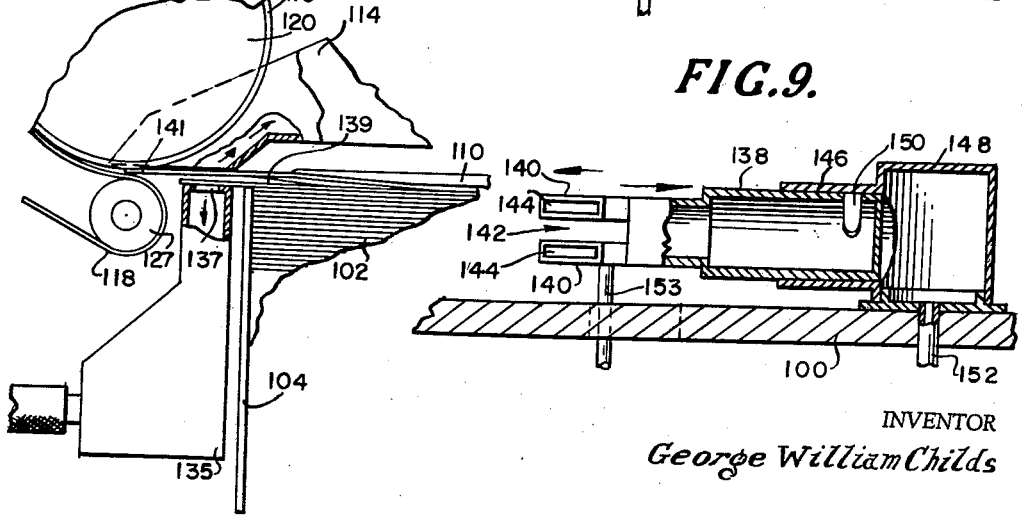
INVENTOR
George William Childs
BY Stevens, Davis, Miller & Mosher
ATTORNEYS Feb. 26, 1963
G. W. CHILDS
3,079,147
SHEET FEEDING
Filed Sept. 2, 1960
3 Sheets-Sheet 3
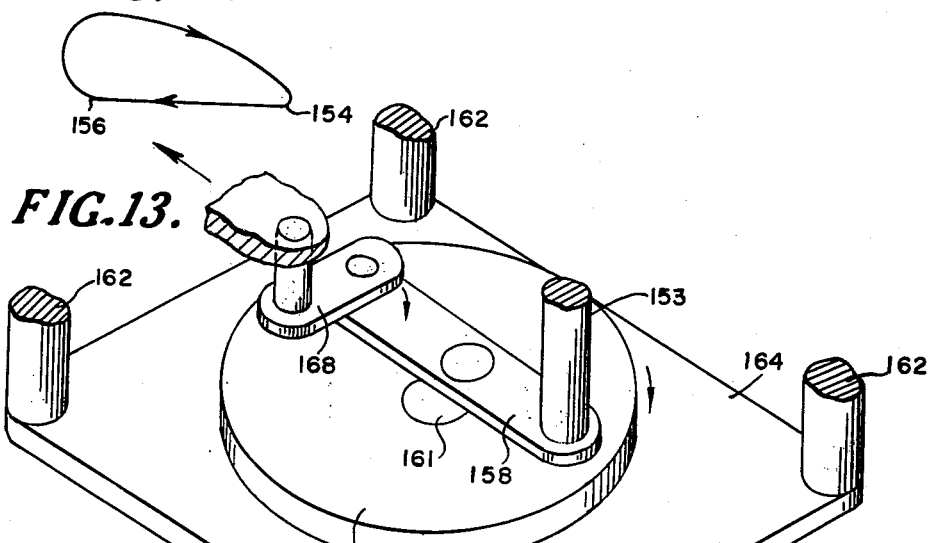
FIG.12.
FIG.13.
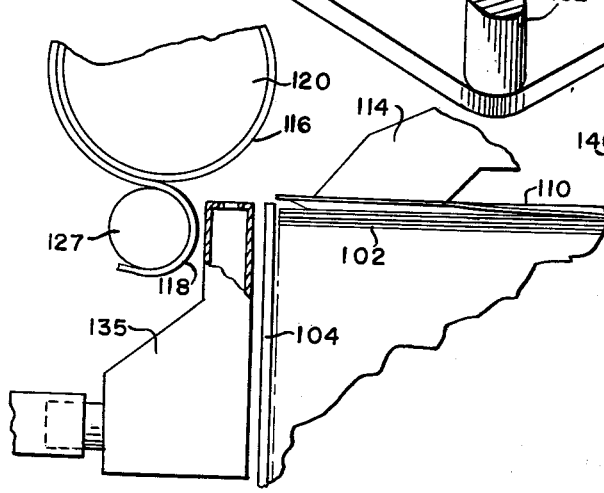
FIG.7.
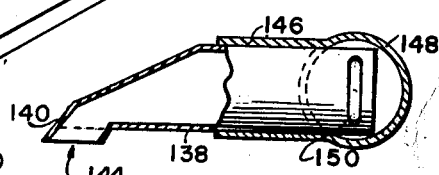
FIG.10.
FIG.11.
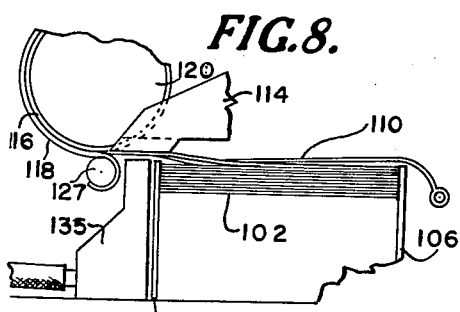
FIG.8.
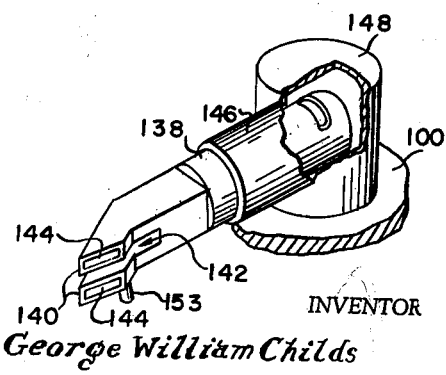
INVENTOR
George William Childs
BY
*Stevens, Davis, Miller & Mosher*
ATTORNEYS

United States Patent Office 3,079,147
Patented Feb. 26, 1963

3,079,147
SHEET FEEDING
George W. Childs, Dallas, Tex., assignor, by mesne assignments, to Sperry Rand Corporation, New York, N.Y., a corporation of Delaware
Filed Sept. 2, 1960, Ser. No. 53,742
11 Claims. (Cl. 271—26)

This invention relates to material handling, and more particularly to an apparatus for picking up sheets of thin material, such as paper, one at a time from a stack and feeding the sheets to a remote location.

In the design of apparatus for performing the function of picking up and feeding thin sheets one at a time to a remote location, there have arisen several problems, particularly when it is desired to feed the sheets at a high rate. One problem is the tendency of the apparatus to pick up and feed more than one sheet at a time from the stack. This particular malfunctioning is referred to as "feeding doubles." Another problem is in the synchronization of the feeding operation so that it is carried out without any damage to the thin sheets. The present invention provides more effective means for the preventing of feeding doubles and for effecting precise synchronization of the feeding operation. The latter is made possible because a vacuum pickup arm, which comes into direct contact with the sheets, is used. This vacuum pickup arm provides more positive feeding action, thereby permitting precise synchronization of the feeding operation and substantially eliminates the problem of damaging the thin sheets.

Accordingly, it is an object of this invention to provide an apparatus which will feed thin sheets from a stack one at a time at a high rate of speed.

It is a further object of this invention to provide an apparatus which will feed thin sheets from a stack one at a time at a high rate of speed without damaging the sheets.

It is a still further object of this invention to provide an improved apparatus for feeding thin sheets from a stack one at a time.

Figure 1:
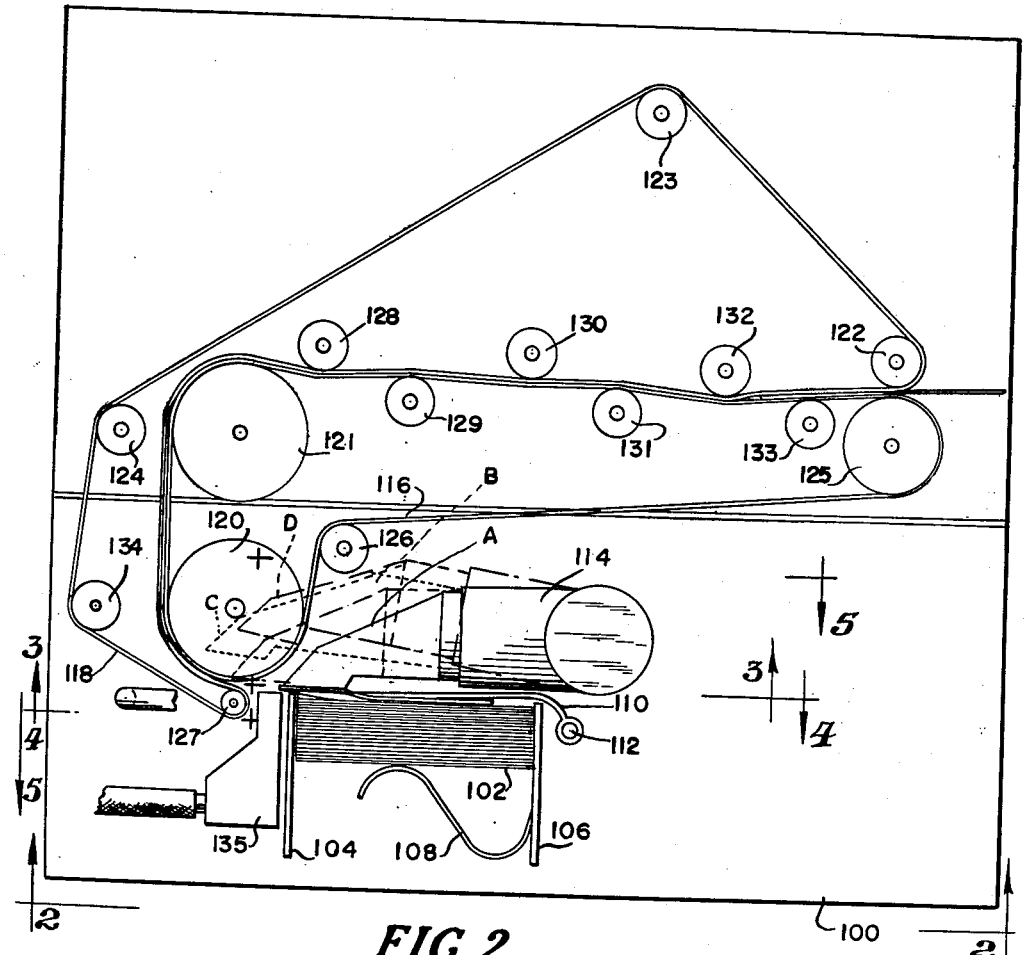
Figure 2:
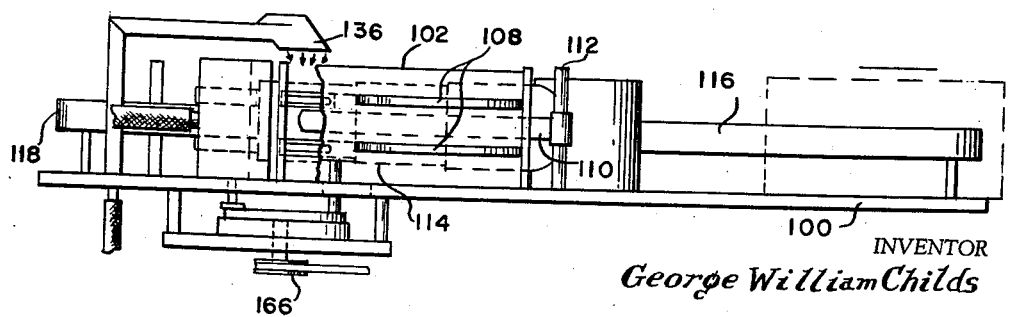

Further objects and advantages of the present invention will become readily apparent as the following detailed description of a specific embodiment of the invention unfolds and when taken in conjunction with the drawings wherein:

FIG. 1 shows a plan view of the apparatus;
FIG. 2 shows a side view of the apparatus;
FIGS. 3, 4 and 5 are sectional views of the apparatus taken through FIG. 1;
FIGS. 6, 7 and 8 are views of the apparatus in various positions illustrating the cycle of operation;
FIGS. 9, 10 and 11 illustrate details of the pickup arm of the apparatus;
FIG. 12 illustrates the path taken by the pickup arm in the operation of the apparatus; and
FIG. 13 illustrates the linkage mechanism for imparting to the pickup arm motion in the path shown in FIG. 12.

As shown in FIGS. 1–5, the sheet feeding apparatus of the invention is mounted on a base plate 100. The thin sheets which are to be fed by the apparatus are in a stack 102, which is held between two guides 104 and 106. A spring 108 forces the stack of sheets 102 against an arm 110 which is mounted on a pivot 112 on the base plate 109. The pivot 112 does not permit the arm 110 to rotate freely, but holds it firmly in position so that the arm 110 and the spring 108 will maintain the stack of sheets 102 in position. Adjustment of the position of the arm 110 about the pivot determines the precise position of the top sheet in the stack 102.

A vacuum pickup arm 114 lifts up the top sheet from the stack 102 and feeds it between two belts 116 and 118, which are driven and guided by a system of pulleys 120 through 134. The belt 116 after passing over pulley 126 passes over the pulley 120, where it comes together with the belt 118. The belt 118 after passing over pulley 127, comes together with the belt 116 and also passes over pulley 120. The two belts 116 and 118 lying together then pass over the pulley 121 and then over a series of pulleys 128 through 133, which maintain the belts 116 and 118 together. The belts 116 and 118 then pass between a pair of the pulleys 122 and 125. The belt 116 continues around the pulley 125 and back to pulley 126 and the belt 118 passes in the opposite direction around the pulley 122 and then is guided back to the pulley 127 by means of pulleys 123, 124 and 134.

The arm 114 feeds the sheets from the stack 102 one at a time to the point where the belts 116 and 118 come together, whereupon the sheets are gripped by the belts 116 and 118 and are transported by the belts 116 and 118 up between the pulleys 122 and 125 where the sheets are fed out of the mechanism. The peripheral speed of the pulley 120 and hence the speeds of the belts 116 and 118 is controlled to be faster than the speed of the laterally moving arm 114 as it brings a sheet up to the point where the belts 116 and 118 come together. This feature causes the belts to pull the sheets positively from the arm 114 without any bending or crumpling of the sheets by the mechanism. After delivering a sheet from the stack 102 to the point where the belts 116 and 118 come together, the arm 114 returns in an oval motion to the stack 102 where it picks up another sheet.

A vacuum member 135 is positioned between the stack 102 and the point where the belts 116 and 118 come together. The vacuum member 135 comprises an evacuated chamber with ducts 137 located just below the path taken by the sheets when transported from the stack 102 to the belts 116 and 118. The ducts 137 can best be seen in FIGS. 4 and 5. The purpose of the vacuum member 135 is to prevent the arm 114 from feeding two or more sheets, which it may have picked up from the stack 102, instead of one to the belts 116 and 118. If the arm 114 has picked up two or more sheets from the stack 102, the air being sucked into the vacuum member 135 will cause all but the top sheet transported by the arm 114 to drop off the arm and only one sheet will be fed to the belts 116 and 118. On the next cycle the arm 114 will then pick up the sheet which was dropped off by the sucking action of the member 135 and feed this sheet between the belts 116 and 118. FIG. 6 illustrates the action after two sheets have simultaneously been picked up by the arm 114. One of the sheets, designated 139, is dropped off by the sucking action of the ducts 137 and it lies with its end extending over the ducts 137. The arm 114 has continued on to the belts 116 and 118 with only one sheet, designated 141, which is fed between the belts 116 and 118. On the next cycle the arm will pick up the sheet 139 and feed it between the belts 116 and 118.

The pressures in the vacuum arm 114 and the vacuum member 135 are adjusted to those precise values which are determined by experimentation to provide optimum operation of the apparatus. The vacuum in the arm 114 is adjusted first to be just greater than that at which reliable pickup from the stack 102 can be maintained. If too great a vacuum is used, the arm 114 not only picks up more than one sheet at a time, but also the additional sheets adhere so tightly to the arm that they cannot be dropped off by the action of the member 135. After the vacuum in the arm 114 is adjusted, the vacuum in the member 135 is adjusted to be just greater than that at which any extra sheets picked up by the arm 114 can reliably be dropped off.

If the vacuum in the member 135 is made too great, the extra sheet or sheets which are dropped off by the action of the member 135 will adhere so tightly to the ducts 137 that they will not be picked up in the succeeding cycles of the vacuum arm 114.

Air under pressure is supplied to separator nozzle 136, which is positioned to direct a stream of air against the side of the stack 102 to riffle the sheets in the stack and reduce the tendency of the arm 114 to pick up more than one sheet.

As shown in FIGS. 9, 10 and 11, the pickup arm 114 comprises a hollow tube 138, the end of which is formed into two feet 140 separated by a slot 142. The ends of the feet 140 have ducts 144 defined therein. These ducts face the stack 102 of sheets when the arm 114 comes into position to pick up a sheet from the stack 102. The pickup of a sheet from the stack 102 is accomplished by exhausting air from the tube 138 and thus causing air to be sucked in the ducts 144. Therefore, when the arm 114 is brought into the pickup position over the stack 102, it will suck up the top sheet from the stack and hold it against the feet 140. When the pickup arm is over the stack 102, the feet 140 straddle the arm 110. In the pickup operation, therefore, the top sheet from the stack 102 is lifted up on both sides of the arm 110, which remains in position. The tube 138 is slidably mounted in a tubular extension 146 on a hollow cylinder 148. The tube 138 extends through the tubular extension 146 into the hollow cylinder 148 where its end is closed off. Near the end of the tube 138 in the cylinder 148 is a slot 150. The hollow cylinder 148 is pivotably mounted on the base plate 100 on a hollow stem 152, by means of which air is exhausted from the hollow cylinder 148. Because the interior of the tube 138 communicates with the interior of the cylinder 148 by means of the slot 150, the exhausting of air from the cylinder 148 causes the air to be exhausted from the tube 138.

The desired motion is imparted to the feet 140 in the operation of the apparatus by means of a pin 153 attached to the tube 138. This pin moves the feet 140 from the pickup position over the stack 102, as shown in FIG. 7, to the delivery position shown in FIG. 8, where the sheet is fed between the belts 116 and 118, and then back in an oval motion to the pickup position. The feet 140 are moved away from the stack 102 in an oval path on their return from the delivery position to the pickup position so that the sucking action of the ducts 144 does not affect the sheets in the stack 102, or any sheets which may have been dropped from the arm 114 by the action of the vacuum member 135, until the feet 140 get to the pickup position. In carrying out this motion the tube 138 slides in the tubular extension 146 to provide the lateral motion of the feet 140 between the pickup and delivery positions and the cylinder 148 rotates in the base plate 100 to provide the motion of the feet 140 when they move away from the stack 102 in their oval path of return to the pickup position.

When the tube 138 gets to the position shown in FIG. 8 where the sheet is grasped between the belts 116 and 118, the tube 138 will be slid out from the tubular extension 146 sufficiently far so that the slot 150 will be brought out of the cylinder 148 and into the tubular extension 146, thus causing the communication between the tube 138 and the cylinder 148 to be cut off. Therefore when the feet 140 get to the delivery position where the sheet is fed between the belts 116 and 118, the sucking action of the ducts 144 is discontinued and the arm 114 releases the sheet just as it is grasped between the belts 116 and 118. This feature of having the sucking action of the ducts 144 cut off just as the delivered sheet is grasped by the belts 116 and 118 prevents the arm 114 from pulling the sheet back out of the belts and permits a very smooth transfer operation between the arm 114 and the belts 116 and 118.

When the arm 114 gets to the position where it feeds a sheet between the belts 116 and 118, the feet 140 of the arm 114 will straddle the pulley 120 and the belt 116, as is best illustrated in FIG. 3. As the arm is brought back to the pickup position in an oval motion the feet 140 will pass on opposite sides of the pulley 120 during the first part of this motion, as illustrated in the dotted-line positions shown of the arm 114 in FIG. 1.

FIG. 12 illustrates the path of motion taken by the feet 140 during the operation of the mechanism as guided and driven by the pin 153. The pickup position corresponding to FIG. 7 is designated in FIG. 12 by the reference number 154. Here the feet 140 come to a substantially complete stop due to the abrupt change in direction of the motion of the feet 140. Because the feet 140 come to a substantially complete stop at the pickup position 154, a more reliable pickup of the sheets from the stack 102 is obtained. At pickup position 154 the feet will be a little less than an eighth of an inch away from the top of the stack 102 and the sucking action through the ducts 144 will lift the top sheet from the stack 102 and hold it against the feet 140. From the pickup position 154 the feet move in a straight line parallel to the top of the stack 102 to the delivery position, designated 156 in FIG. 12, where the sheet is delivered between the belts 116 and 118. At position 156 the tube 138 will be extended just enough to cut off the vacuum in the tube 138 and the sheet will be released from the feet 140. After delivering the sheet between the belts 116 and 118 the feet 140 then arc away from the stack and do not come near the stack again until they reach the pickup point 154, thus preventing during their return any interference with the sheets in the stack 102 or with any sheet which may have been dropped from the arm 114 by the member 135.

As shown in FIG. 13, which illustrates the mechanism for providing the motion depicted in FIG. 12 of the feet 140, the pin 153, which drives the arm 114, is mounted on one end of an arm 158. The middle of the arm 158 is pivotally mounted on a disc 160, which is driven at a constant speed by a shaft 161. The mechanism shown in FIG. 13 is mounted on a plate 164 on the opposite side of the base plate 100 from the arm 114 and is attached to the base plate 100 by means of rods 162. The disc 160 is rotatably mounted on the plate 164 and the shaft 161 which drives the disc 160 passes through the plate 164 to a mechanism for driving it at a constant speed. A link 168 is pivotally mounted at one end on the base plate 100 and the other end of the link 168 is pivotally attached to the arm 158 at the opposite end from the pin 153. With this mechanism the pin 153 and therefore the feet 140 will describe the motion depicted in FIG. 12 when the disc 160 is rotated, and the feet 140 will come to a substantially complete stop each time they come to position 154. The fact that the arm 114 comes to a substantially complete stop in the pickup position followed by a straight line motion to the delivery position parallel to the top of the stack insures that the arm 114 will make a pickup, and that when more than one sheet is picked up the extra sheet or sheets will be dropped off by the action of the member 135. In operation the apparatus will be feeding the sheets at a high rate and the arm 114 will accelerate to a high velocity in the straight line motion from the pickup position 154 to the delivery position 156. If the arm did not come to a substantially complete stop at the pickup position 154, slippage between the sheet picked up and the arm 114 would occur and damage to the sheet would result.

The arm 110 is adjusted so that at the pickup position 154 the feet will be less than one-eighth of an inch away from the stack 102. If the arm 110 is depressed to move the top of the stack 102 more than one quarter of an inch away from the feet 140 when they are in the pickup position 154, pickup will not occur. Thus the operation can be controlled simply by adjusting the arm 110. A small rotation of the arm 110 in a clockwise direction starts the feeding of sheets from the stack 102 and a small rotation of the arm 110 in a counter-clockwise direction will stop the feeding operation. The arm 110 may be controlled by a solenoid for remote or automatic control of the starting and stopping of the feeding operation.

The apparatus of this invention as described above will feed sheets from the stack 102 one at a time at a rate of 20 per second with little or no tendency to feed doubles or to damage the sheets. The above described apparatus is a preferred embodiment of the invention, and many modifications may be made thereto without departing from the spirit and scope of the invention, which is limited only as defined in the appended claims.

What is claimed is:

1. A material handling apparatus comprising means to hold a stack of thin sheets, a vacuum operated pickup means, means to drive said vacuum operated pickup means to cyclically move said vacuum operated pickup means from a position over said stack to a position remote from said stack in a predetermined path going away from said stack along a line initially parallel to the top of said stack, said vacuum operated pickup means coming to a substantial stop over said stack once each cycle and causing the top sheet to be picked up from said stack by said vacuum operated pickup means and carried to said remote position, means to remove from said vacuum operated pickup means the sheet carried by the last said means at said remote position, means defining a duct fixedly positioned adjacent said stack and close but spaced from said path, means to suck air in through said duct to cause all the sheets but the one carried by said vacuum operated pickup means to be dropped from the last said means in a position substantially on the top of said stack to be picked up by said arm on the succeeding cycles of said arm.

2. A material handling apparatus as recited in claim 1 further comprising means to direct a stream of air against a side of said stack.

3. A material handling apparatus comprising means to hold a stack of thin sheets, a pickup arm having a first duct defined in the end thereof, means to suck air in through said duct, means to drive said arm to cyclically move said duct from a position over said stack to a position remote from said stack in a predetermined path going away from said stack along a line initially parallel to the top of said stack, said duct coming to a substantial stop over said stack once each cycle, the sucking action of said duct causing the top sheet to be picked up from said stack by said arm and carried to said remote position, means to remove from said arm the sheet carried by said arm at said remote position, means defining a second duct fixedly positioned adjacent said stack and close to but spaced from said path, and means to suck air in through said second duct to cause all the sheets but one carried by said arm to be dropped from said arm substantially on top of said stack in a position to be picked up by said arm on the succeeding cycles of said arm.

4. A material handling apparatus comprising means to hold a stack of thin sheets, pickup arm having a first duct defined in the end thereof, means to suck air in through said first duct, means to drive said pickup arm to cyclically move said first duct from a position over said stack to a position remote from said stack through a predetermined path going away from said stack along a line initially parallel to the top of said stack and causing said first duct to come to a substantial stop over said stack once each cycle, the sucking action through said first duct causing the top sheet from said stack to be picked up by said arm and carried by said arm to said remote position, means to remove from said arm the sheet carried by said arm at said remote position, means defining a second duct fixedly positioned adjacent said stack and adjacent said predetermined path, and means to suck air in through said second duct, said second duct causing all the sheets but one carried by said pickup arm to drop off said pickup arm into a position substantially on top of said stack to be picked up by said pickup arm on the succeeding cycles thereof.

5. A material handling apparatus comprising means to hold a stack of thin sheets, a pickup arm having a duct defined in the end thereof, means to suck air in through said duct, means to drive said arm to cyclically move said duct from a position over said stack to a remote position through a path which goes in a straight line from said position over said stack to said remote position and which curves away from the top of said stack on the return from said remote position to a substantial stop position over said stack once each cycle, the sucking action through said duct causing the top sheet from said stack to be picked up by said arm and carried to said remote position, and means to remove the sheet carried by said arm from said arm at said remote position.

6. A material handling apparatus comprising means to hold a stack of thin sheets, a pickup arm having a first duct defined in the end thereof, means to suck air in through said first duct, means to drive said arm to cyclically move said duct from a position over said stack to a remote position in a motion that brings said duct to a substantially complete stop over said stack and in a path which goes in a straight line from a position over said stack to said remote position and which curves away from the top of said stack in return from said remote position to said position over said stack, the sucking action through said duct causing the top sheet from said stack to be picked up by said arm and carried to said remote position, and means to remove from said arm the sheet carried by said arm at said remote position, and means defining a second duct adjacent said stack, and close but spaced from said path, and means to suck air through said second duct to cause all sheets but the one carried by said arm to be dropped from said arm substantially on top of said stack in a position to be picked up on the next succeeding cycles of said arm.

7. A material handling apparatus comprising means to hold a stack of thin sheets, vacuum operated means to pick up one sheet at a time, means to drive said vacuum operated pick up means to carry such sheet to a remote position in a predetermined path going away from said stack along a line initially parallel to the top of said stack and cause said vacuum operated pickup means to come to a substantial stop over said stack once each cycle, means defining a duct fixedly positioned alongside of said stack and close to but spaced from said predetermined path, and means to suck air in through said duct to cause all of the sheets but one carried by said pickup means to be dropped from said pickup means in a position substantially on top of said stack to be picked up on the succeeding cycles of said pickup means.

8. A material handling apparatus as recited in claim 7 further comprising means to direct a stream of air against the side of said stack.

9. A material handling apparatus as recited in claim 7 wherein said means to drive said vacuum operated means comprises a disc, means to rotate said disc about an axis, a linkage arm pivotally mounted on said disc between its ends at a point on said disc spaced from said axis, means pivotally connecting one end of said linkage arm to said vacuum operated means, and a link pivotally mounted at one end and pivotally connected at its other end to the other end of said linkage arm.

10. A material handling apparatus as recited in claim 7 wherein said vacuum operated means comprises a pickup arm having two feet on the end thereof separated by a slot with ducts defined in said feet, means to suck air in through said ducts, a pulley at a remote position, a pair of belts coming together over said pulley, means to drive said pickup arm to cyclically move said feet from a position over said stack to the point where said belts come together with said feet straddling said pulley.

11. A material handling apparatus as defined in claim 7 wherein the vacuum operated means comprises means defining a chamber, a tubular extension on said chamber, a tube slidably mounted in said tubular extension having one end closed off extending into said chamber and the other end having a duct defined therein, and wherein the means to drive said vacuum operated means cyclically moves said duct from a position over said stack to a remote position sliding said tube in and out of said tubular extension, said tube having an opening defined in the wall thereof communicating said chamber with the interior of said tube and positioned to be closed off by said tubular extension when said tube is driven to move said duct to said remote position, and means to exhaust the air from said chambers causing air to be sucked in through said duct, the sucking action by said duct causing the top sheet from said stack to be picked up by said tube and carried to said remote position, the closing off of said opening in the wall of said tube when said duct gets to said remote position causing the sucking action by said duct to cease when said duct gets to said remote position.

References Cited in the file of this patent
UNITED STATES PATENTS

| | | |
|---|---|---|
| 1,040,025 | Schlesinger | Oct. 1, 1912 |
| 1,539,083 | Henderson | May 26, 1925 |
| 1,908,094 | Williams | May 9, 1933 |
| 1,920,388 | Harrold | Aug. 1, 1933 |
| 2,085,612 | Spiess | June 29, 1937 |
| 2,185,652 | Spiess | Jan. 2, 1940 |
| 2,402,442 | Perry | June 18, 1946 |
| 2,601,984 | Pope | July 1, 1952 |
| 2,819,076 | Wendt et al. | Jan. 7, 1958 |
| 2,977,114 | Hanson et al. | Mar. 28, 1961 |
| 2,979,330 | Weber | Apr. 11, 1961 |